(12) United States Patent
Ma et al.

(10) Patent No.: US 9,665,565 B2
(45) Date of Patent: May 30, 2017

(54) SEMANTIC SIMILARITY EVALUATION METHOD, APPARATUS, AND SYSTEM

(71) Applicant: Huawei Technologies Co., Ltd., Shenzhen (CN)

(72) Inventors: Lin Ma, Hong Kong (HK); Kai Liu, Beijing (CN); Hao Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/982,365

(22) Filed: Dec. 29, 2015

(65) Prior Publication Data

US 2016/0196258 A1 Jul. 7, 2016

(30) Foreign Application Priority Data

Jan. 4, 2015 (CN) .......................... 2015 1 0003802

(51) Int. Cl.
*G06F 17/27* (2006.01)
*G06F 17/28* (2006.01)

(52) U.S. Cl.
CPC ...... *G06F 17/2785* (2013.01); *G06F 17/2836* (2013.01); *G06F 17/2854* (2013.01)

(58) Field of Classification Search
CPC ............. G06F 17/2785; G06F 17/2836; G06F 17/2854
USPC ................................................ 704/1, 9, 2, 4
See application file for complete search history.

(56) References Cited

U.S. PATENT DOCUMENTS

| | | | | |
|---|---|---|---|---|
| 6,356,864 B1 * | 3/2002 | Foltz | ................... | G06F 17/2785 434/353 |
| 6,523,026 B1 * | 2/2003 | Gillis | ................ | G06F 17/30637 |
| 7,406,456 B2 * | 7/2008 | Calistri-Yeh | ...... | G06F 17/30731 704/9 |
| 2003/0046263 A1 * | 3/2003 | Castellanos | ....... | G06F 17/30719 |
| 2009/0210218 A1 * | 8/2009 | Collobert | ............. | G06F 17/277 704/9 |

(Continued)

OTHER PUBLICATIONS

Achananuparp, Palakorn, et al. "The evaluation of sentence similarity measures." International Conference on Data Warehousing and Knowledge Discovery. Springer Berlin Heidelberg, Sep. 2008, pp. 305-316.*

(Continued)

*Primary Examiner* — James Wozniak
(74) *Attorney, Agent, or Firm* — Conley Rose, P.C.

(57) ABSTRACT

A semantic similarity evaluation method includes performing word vectorization processing separately on words in a first sentence and a word in a second sentence to obtain a first word vector and a second word vector; performing, in a preset word vector compression order, compression coding processing on the first word vector according to a first compression coding parameter to obtain a first statement vector; performing, in the preset word vector compression order, compression coding processing on the second word vector according to a second compression coding parameter to obtain a second statement vector; and determining a vector distance between the first statement vector and the second statement vector, and evaluating a semantic similarity between the first sentence and the second sentence according to the vector distance. The method is used to evaluate a semantic similarity.

9 Claims, 3 Drawing Sheets

(56) References Cited

U.S. PATENT DOCUMENTS

| | | | | |
|---|---|---|---|---|
| 2014/0207439 A1* | 7/2014 | Venkatapathy | ..... | G06F 17/2836 704/4 |
| 2015/0227505 A1* | 8/2015 | Morimoto | ........... | G06F 17/2785 704/9 |
| 2016/0196258 A1* | 7/2016 | Ma | ...................... | G06F 17/2785 704/8 |
| 2016/0217129 A1* | 7/2016 | Lu | ........................... | G06F 17/30 |

OTHER PUBLICATIONS

Blacoe, William, et al. "A comparison of vector-based representations for semantic composition." Proceedings of the 2012 Joint Conference on Empirical Methods in Natural Language Processing and Computational Natural Language Learning. Association for Computational Linguistics, Jul. 2012, pp. 546-556.*

Canhasi, Ercan. "Measuring the sentence level similarity." Dec. 2013, pp. 35-42.*

Faruqui, Manaal, et al. "Improving vector space word representations using multilingual correlation." Association for Computational Linguistics, Apr. 2014, pp. 462-471.*

Gao, Jianfeng, et al. "Learning semantic representations for the phrase translation model." arXiv preprint arXiv:1312.0482, Nov. 2013, pp. 1-9.*

Gu, Tianjiao, et al. "Chinese sentence similarity based on word context and semantic." Natural Language Processing and Knowledge Engineering, 2009. NLP-KE 2009. International Conference on. IEEE, Sep. 2009, pp. 1-5.*

Guo, Weiwei, et al. "Modeling sentences in the latent space." Proceedings of the 50th Annual Meeting of the Association for Computational Linguistics: Long Papers—vol. 1. Association for Computational Linguistics, Dec. 2012, pp. 864-872.*

Huerta, Juan M. "Vector based Approaches to Semantic Similarity Measures." Advances in Natural Language Processing and Applications, Jan. 2008, pp. 163-173.*

Lee, Lillian. "Measures of distributional similarity." Proceedings of the 37th annual meeting of the Association for Computational Linguistics on Computational Linguistics. Association for Computational Linguistics, Jun. 1999, pp. 25-32.*

Li, Yuhua, et al. "A Method for Measuring Sentence Similarity and ilts Application to Conversational Agents." FLAIRS Conference. May 2004, pp. 1-6.*

Maas, Andrew L., et al. "A probabilistic model for semantic word vectors." NIPS Workshop on Deep Learning and Unsupervised Feature Learning. Dec. 2010, pp. 1-8.*

Marton, Yuval, et al. "Improved statistical machine translation using monolingually-derived paraphrases." Proceedings of the 2009 Conference on Empirical Methods in Natural Language Processing: vol. 1-vol. 1. Association for Computational Linguistics, Aug. 2009, pp. 381-390.*

Mihalcea, Rada, et al. "Corpus-based and knowledge-based measures of text semantic similarity." AAAI. vol. 6. 2006, pp. 775-780.*

Mikolov, Tomas, et al. "Efficient estimation of word representations in vector space." arXiv preprint arXiv:1301.3781, Sep. 2013, pp. 1-12.*

O'Connor, Brendan. "Cosine similarity, Pearson correlation, and OLS coefficients." Retrieved from https://brenocon.com/blog/2012/03/cosine-similarity-pearson-correlation-and-ols-coefficients, Mar. 2012, pp. 1-3.*

Pan, Liqiang, et al. "Semantic Similarity Calculation of Chinese Word." (IJACSA) International Journal of Advanced Computer Science and Applications, vol. 5, No. 8, 2014, Aug. 2014, pp. 8-12.*

Saad, Sazianti Mohd, et al. "Comparative analysis of similarity measures for sentence level semantic measurement of text." Control System, Computing and Engineering (ICCSCE), 2013 IEEE International Conference on. IEEE, Dec. 2013, pp. 90-94.*

Turney, Peter D., et al. "From frequency to meaning: Vector space models of semantics." Journal of artificial intelligence research 37.1, Feb. 2010, pp. 141-188.*

Zou, Will Y., et al. "Bilingual Word Embeddings for Phrase-Based Machine Translation." EMNLP. Oct. 2013, pp. 1-6.*

Mikolov, T., et al., "Distributed Representations of Words and Phrases and their Compositionality," In: NIPS: Proceedings of Neural Information Processing Systems, 2013, 9 pages.

Mikolov, T., et al., "Efficient Estimation of Word Representations in Vector Space," arXiv: 1301.3781v3 [cs.CL], Sep. 7, 2013, 12 pages.

Mikolov, T., et al., "Linguistic Regularities in Continuous Space Word Representations," Proceedings of the 2013 Conference of the North American Chapter of the Association for Computational Linguistics: Human Language Technologies, May 27, 2013, 6 pages.

Denkowski, M., et al., "Meteor Universal: Language Specific Translation Evaluation for Any Target Language," Proceedings of the Ninth Workshop on Statistical Machine Translation, Jun. 26-27, 2014, pp. 376-380.

\* cited by examiner

Semantic evaluation system 30

SEMANTIC SIMILARITY EVALUATION METHOD, APPARATUS, AND SYSTEM

CROSS-REFERENCE TO RELATED APPLICATIONS

This application claims priority to Chinese Patent Application No. 201510003802.2, filed on Jan. 4, 2015, which is hereby incorporated by reference in its entirety.

TECHNICAL FIELD

The present disclosure relates to the field of machine translation, and in particular, to a semantic similarity evaluation method, apparatus, and system.

BACKGROUND

Machine translation enables automatic translation from one language into another language. With development of economic globalization, information exchange between countries using different languages becomes increasingly frequent, and quickly acquiring multilingual information and resources by means of machine translation has become an inevitable trend.

In a process of machine translation, semantic similarity evaluation performed on sentences in different languages helps to obtain a translated text that is more accurately translated. In addition, the machine translation cannot provide translated text that is totally accurate, and a sentence that requires manual modification can be quickly located in the translated text by means of semantic similarity evaluation.

In the prior art, semantic similarity evaluation is mainly based on external resource matching. For a sentence obtained through translation, a semantic similarity between the sentence obtained through translation and a source sentence is evaluated by querying an external resource, where the external resource may be a dictionary or an existing scheme for bilingual matching. However, the foregoing semantic similarity evaluation is word-based semantic evaluation, without regard to a word order, and therefore, the evaluation is inaccurate. For example, a source sentence is "早上好" in Chinese, and a sentence obtained through translation is "morning good" in English. It may be known by consulting a dictionary that semantic meanings of two words "早上" and "morning" are consistent and that semantic meanings of "好" and "good" are consistent; as a result, in the prior art, semantic meanings of the two sentences "早上好" and "morning good" are evaluated as consistent, leading to a mistake in semantic similarity evaluation.

SUMMARY

The present disclosure provides a semantic similarity evaluation method, apparatus, and system, which are used to resolve a problem in the prior art that a semantic similarity of sentences in which word orders are adjusted cannot be correctly evaluated.

To achieve the foregoing objective, embodiments of the present disclosure use the following technical solutions.

According to a first aspect, a semantic similarity evaluation method is provided, including performing word vectorization processing separately on words in a first sentence and a word in a second sentence to obtain a first word vector and a second word vector, where the first sentence includes at least two words, the first word vector includes word vectors of all the words in the first sentence, the second sentence includes at least one word, and the second word vector includes word vectors of all words in the second sentence; performing, in a preset word vector compression order, compression coding processing on the first word vector according to a first compression coding parameter to obtain a first statement vector; when the second sentence includes one word, using the second word vector as a second statement vector; or when the second sentence includes at least two words, performing, in the preset word vector compression order, compression coding processing on the second word vector according to a second compression coding parameter to obtain a second statement vector; and determining a vector distance between the first statement vector and the second statement vector, and evaluating a semantic similarity between the first sentence and the second sentence according to the vector distance.

With reference to the first aspect, in a first possible implementation manner of the first aspect, the first compression coding parameter includes at least two layers of neural network parameters, and the performing, in a preset word vector compression order, compression coding processing on the first word vector according to a first compression coding parameter to obtain a first statement vector includes performing compression coding for the first time on a first word vector and a second word vector in the first word vector according to a first layer neural network parameter to generate an intermediate compression vector; and performing compression coding for the second time on the intermediate compression vector and a third word vector according to a second layer neural network parameter until compression coding is performed on all word vectors in the first word vector, to obtain the first statement vector, where vector dimensions of all the word vectors in the first word vector, the intermediate compression vector, and the first statement vector are the same.

With reference to the first aspect or the first possible implementation manner of the first aspect, in a second possible implementation manner, the determining a vector distance between the first statement vector and the second statement vector includes obtaining, by calculating a formula $$sim(v_1, v_2) = \frac{(v_1 - v_2)(v_1 - v_2)}{|v_1 * v_2|},$$

the vector distance between the first statement vector and the second statement vector, where $v_1$ is the first statement vector, $v_2$ is the second statement vector, and $sim(v_1,v_2)$ is the vector distance.

With reference to any one of the first aspect to the second possible implementation manner of the first aspect, in a third possible implementation manner, the method further includes performing training on the first compression coding parameter and the second compression coding parameter using a bilingual parallel corpus, including performing word vectorization processing on a first training sentence in the bilingual parallel corpus and a second training sentence that has a same semantic meaning as the first training sentence, to obtain a first training word vector and a second training word vector; performing compression coding separately on the first training word vector and the second training word vector according to the first compression coding parameter and the second compression coding parameter, to obtain a first training statement vector of the first training sentence and a second training statement vector of the second training sentence; determining a vector distance between the first training statement vector and the second training statement vector; when the vector distance does not meet a preset condition, acquiring a difference vector between the first training statement vector and the second training statement vector, performing error propagation on the difference vector using a back propagation (BP) algorithm for a neural network, and adjusting the first compression coding parameter and the second compression coding parameter according to the difference vector; and redetermining a vector distance between the first training statement vector and the second training statement vector using a first compression coding parameter and a second compression coding parameter that are obtained by means of the adjustment, and when the vector distance meets the preset condition, stopping performing training on the first compression coding parameter and the second compression coding parameter.

With reference to the third possible implementation manner of the first aspect, in a fourth possible implementation manner, the adjusting the first compression coding parameter and the second compression coding parameter according to the difference vector includes determining a layer error vector corresponding to each layer of neural network parameters in the first compression coding parameter, and determining a gradient of each layer of neural network parameters according to the layer error vector; and adjusting each layer of neural network parameters using an average value of the gradients of the layers of neural network parameters, or adjusting each layer of neural network parameters using a gradient of a lower-layer neural network parameter, or adjusting each layer of neural network parameters using a gradient of an upper-layer neural network parameter, where the lower-layer neural network parameter is a neural network parameter used in the last time of compression coding, and the upper-layer neural network parameter is a neural network parameter used in the first time of compression coding.

According to a second aspect, a semantic evaluation system is provided, including a word vectorization apparatus, a vector compression coding apparatus, and a semantic contrast apparatus, where the word vectorization apparatus is connected to the vector compression coding apparatus, and the vector compression coding apparatus is connected to the semantic contrast apparatus; the word vectorization apparatus is configured to perform word vectorization processing separately on words in a first sentence and a word in a second sentence to obtain a first word vector and a second word vector, where the first sentence includes at least two words, the first word vector includes word vectors of all the words in the first sentence, the second sentence includes at least one word, and the second word vector includes word vectors of all words in the second sentence; the vector compression coding apparatus is configured to perform, in a preset word vector compression order, compression coding processing on the first word vector according to a first compression coding parameter to obtain a first statement vector; and when the second sentence includes at least two words, perform, in the preset word vector compression order, compression coding processing on the second word vector according to a second compression coding parameter to obtain a second statement vector, or when the second sentence includes one word, use the second word vector as the second statement vector; and the semantic contrast apparatus is configured to determine a vector distance between the first statement vector and the second statement vector, and evaluate a semantic similarity between the first sentence and the second sentence according to the vector distance.

With reference to the second aspect, in a first possible implementation manner of the second aspect, the vector compression coding apparatus is configured to perform compression coding for the first time on a first word vector and a second word vector in the first word vector according to a first layer neural network parameter to generate an intermediate compression vector; and perform compression coding for the second time on the intermediate compression vector and a third word vector according to a second layer neural network parameter, until compression coding is performed on all word vectors in the first word vector to obtain the first statement vector, where vector dimensions of all the word vectors in the first word vector, the intermediate compression vector, and the first statement vector are the same.

With reference to the second aspect or the first possible implementation manner of the second aspect, in a second possible implementation manner, the semantic contrast apparatus is configured to obtain, by calculating a formula $$sim(v_1, v_2) = \frac{(v_1 - v_2)(v_1 - v_2)}{|v_1 * v_2|},$$

the vector distance between the first statement vector and the second statement vector, where $v_1$ is the first statement vector, $v_2$ is the second statement vector, and $sim(v_1,v_2)$ is the vector distance.

With reference to any one of the second aspect to the second possible implementation manner of the second aspect, in a third possible implementation manner, the system further includes a contrast-difference training apparatus and a training-end determining apparatus; the word vectorization apparatus is further configured to perform word vectorization processing on a first training sentence in a bilingual parallel corpus and a second training sentence that has a same semantic meaning as the first training sentence, to obtain a first training word vector and a second training word vector; the vector compression coding apparatus is further configured to perform compression coding separately on the first training word vector and the second training word vector according to the first compression coding parameter and the second compression coding parameter, to obtain a first training statement vector of the first training sentence and a second training statement vector of the second training sentence; the semantic contrast apparatus is further configured to determine a vector distance between the first training statement vector and the second training statement vector; the training-end determining apparatus is configured to determine whether the vector distance meets a preset condition; the contrast-difference training apparatus is configured to, when the vector distance does not meet the preset condition, acquire a difference vector between the first training statement vector and the second training statement vector, and perform error propagation on the difference vector using a BP algorithm for a neural network; the vector compression coding apparatus is further configured to adjust the first compression coding parameter and the second compression coding parameter according to the difference vector; and the training-end determining apparatus is further configured to, when determining that the vector distance meets the preset condition, stop performing training on the first compression coding parameter and the second compression coding parameter.

With reference to the third possible implementation manner of the second aspect, in a fourth possible implementation manner, the vector compression coding apparatus is configured to determine a layer error vector corresponding to each layer of neural network parameters in the first compression coding parameter, and determine a gradient of each layer of neural network parameters according to the layer error vector; and adjust each layer of neural network parameters using an average value of the gradients of the layers of neural network parameters, or adjust each layer of neural network parameters using a gradient of a lower-layer neural network parameter, or adjust each layer of neural network parameters using a gradient of an upper-layer neural network parameter, where the lower-layer neural network parameter is a neural network parameter used in the last time of compression coding, and the upper-layer neural network parameter is a neural network parameter used in the first time of compression coding.

According to a third aspect, a vector compression coding apparatus is provided, including an acquiring unit configured to acquire a first word vector and a second word vector, where the first word vector includes word vectors of all words in a first sentence, the second word vector includes word vectors of all words in a second sentence, the first sentence includes at least two words, and the second sentence includes at least one word; a vector compression unit configured to perform, in a preset word vector compression order, compression coding processing on the first word vector according to a first compression coding parameter to obtain a first statement vector; and when the second sentence includes one word, use the second word vector as a second statement vector; or when the second sentence includes at least two words, perform, in the preset word vector compression order, compression coding processing on the second word vector according to a second compression coding parameter to obtain a second statement vector; and a sending unit configured to send the first statement vector and the second statement vector to a semantic contrast apparatus, such that the semantic contrast apparatus determines a vector distance between the first statement vector and the second statement vector, and evaluates a semantic similarity between the first sentence and the second sentence according to the vector distance.

In the foregoing solutions, a first statement vector of a first sentence and a second statement vector of a second sentence are obtained by means of compression coding; a vector distance between the first statement vector and the second statement vector is calculated; and a semantic similarity between the first sentence and the second sentence is evaluated according to the vector distance, where a shorter vector distance indicates a higher semantic similarity between the first sentence and the second sentence. In this case, a sentence in which a word order is adjusted is represented as one vector, thereby avoiding separately comparing semantic meanings of words in a sentence; therefore, the technical solutions in the present disclosure can be used to perform accurate semantic similarity evaluation on a sentence in which a word order is adjusted.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
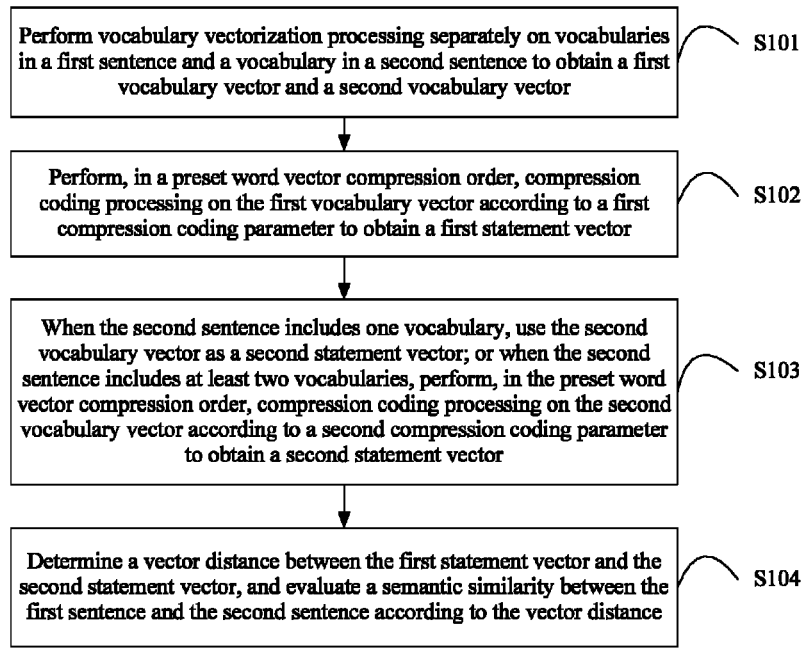
FIG. 1 is a schematic flowchart of a semantic similarity evaluation method according to an embodiment of the present disclosure.

An embodiment of the present disclosure provides a semantic similarity evaluation method. As shown in FIG. 1, the method includes the following steps.

S101: Perform word vectorization processing separately on words in a first sentence and a word in a second sentence to obtain a first word vector and a second word vector.

The first sentence includes at least two words, the first word vector includes word vectors of all the words in the first sentence, the second sentence includes at least one word, and the second word vector includes word vectors of all words in the second sentence.

It should be noted that word vectorization is a method for representing a word in a mathematical manner. In neuro-linguistic programming (NLP), a most frequently used method for representing a word is One-hot Representation. In this method, each word is represented as one vector, and a dimension of the vector is the same as a size of a word table, where most elements in the vector are 0, only one dimension has a value of 1, and this dimension represents a current word. For example, "mike" is represented by [0 0 0 1 0 0 0 0 0 0 0 . . . ] and "microphone" is represented by [0 0 0 0 0 0 0 0 1 0 0 . . . ]. There are multiple existing word vectorization manners, where a word vector generally used in deep learning of a machine is not a word vector represented using the foregoing One-hot Representation method, but is a low-dimensional real vector represented by means of Distributed Representation. A specific form of a word vector generated by means of Distributed Representation is [0.13, −0.29, . . . , 0.91, 0.88], and dimension 50 and dimension 100 are relatively commonly used dimensions of the word vector. A largest contribution of Distributed Representation is that related or similar words are closer in distance. A distance between vectors may be measured using a traditional Euclidean distance, or may be measured using a cosine included angle.

The present disclosure does not impose a limitation on a word vectorization technology that is used, which may be One-hot Representation, Distributed Representation, or another word vectorization manner. By performing training on word vectors using a large quantity of corpora, an existing word vectorization technology may be used to effectively differentiate expressions of words with a same meaning, polysemy of a word, and paraphrasing of a word.

Using the existing word vectorization technology, for example, Distributed Representation, all the words in the first sentence and all words in the second sentence are represented in a word vectorization manner, where the first sentence and the second sentence may be sentences in different languages, or sentences in a same language.

S102: Perform, in a preset word vector compression order, compression coding processing on the first word vector according to a first compression coding parameter to obtain a first statement vector.

Exemplarily, a first sentence is: I eat apples. Then, three words "I", "eat", and "apples" are included in the first sentence, and a first word vector is obtained using the word vectorization technology, where the first word vector includes a word vector $c_1$ of the word "I", a word vector $c_2$ of the word "eat", and a word vector $c_3$ of the word "apples". In addition, a compression order of the word vectors is preset to a left-to-right order; compression coding is performed on the word vectors $c_1$ and $c_2$ first, and then compression coding is performed on the word vector $c_3$.

It should be noted that a word vector compression order may be preset by a user; the above is only an exemplary description, and the present disclosure does not impose a limitation on the word vector compression order. The word vector compression order may also be from right to left, or the word vector compression order is set according to a grammatical structure. For example, a grammatical structure of the first sentence includes a subject, a predicate, and an object; it may be preset that compression coding is performed on a word vector of the predicate and a word vector of the object first, and then compression coding is performed on a word vector of the subject.

More specifically, the first compression coding parameter includes at least two layers of neural network parameters; then compression coding is performed for the first time on a first word vector and a second word vector in the first word vector according to a first layer neural network parameter to generate an intermediate compression vector, and compression coding is performed for the second time on the intermediate compression vector and a third word vector according to a second layer neural network parameter until compression coding is performed on all word vectors in the first word vector, to obtain the first statement vector, where vector dimensions of all the word vectors in the first word vector, the intermediate compression vector, and the first statement vector are the same.

Figure 2:
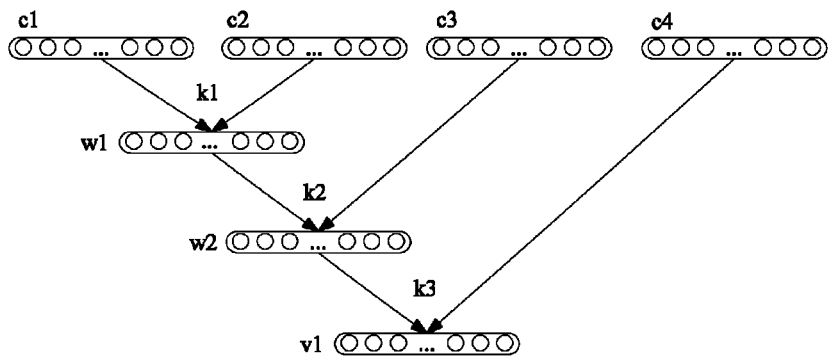
FIG. 2 is a schematic diagram of word vector compression coding according to an embodiment of the present disclosure.

Exemplarily, compression coding of a vector refers to autoregression of the vector. In the compression coding, a model is created based on a statistic property of data and compression coding is performed on word vectors pairwise using a neural network parameter. For example, as shown in FIG. 2, the first compression coding parameter includes a first layer neural network parameter $k_1$, a second layer neural network parameter $k_2$, and a third layer neural network parameter $k_3$. For word vectors $c_1$, $c_2$, $c_3$, and $c_4$, where vector dimensions of the word vectors $c_1$, $c_2$, $c_3$, and $c_4$ are 50, in a left-to-right order, first, the first layer neural network parameter $k_1$ is used to perform compression coding on the word vectors $c_1$ and $c_2$ to obtain an intermediate compression vector $w_1$ whose vector dimension is 50; then the second layer neural network parameter $k_2$ is used to perform compression coding on the intermediate compression vector $w_1$ and the word vector $c_3$ to obtain an intermediate compression vector $w_2$ whose vector dimension is 50; finally, the third layer neural network parameter $k_3$ is used to perform compression coding on the intermediate compression vector $w_2$ and the word vector $c_4$ to obtain a first statement compression vector $v_1$ whose vector dimension is 50.

S103: When the second sentence includes one word, use the second word vector as a second statement vector; or when the second sentence includes at least two words, perform, in the preset word vector compression order, compression coding processing on the second word vector according to a second compression coding parameter to obtain a second statement vector.

More specifically, when the second sentence includes only one word, a word vector of the word is the second statement vector of the second sentence, and therefore, compression coding is not required; or when the second sentence includes at least two words, compression coding is performed on the second word vector of the second sentence, and for details, reference may be made to the description of compression coding performed on the first sentence.

It should be noted that, to use the first compression coding parameter and the second compression coding parameter to perform accurate compression coding processing on the first sentence and the second sentence, a bilingual parallel corpus needs to be used to perform training on the first compression coding parameter and the second compression coding parameter. A specific method is performing word vectorization processing on a first training sentence in the bilingual parallel corpus and a second training sentence that has a same semantic meaning as the first training sentence, to obtain a first training word vector and a second training word vector; performing compression coding separately on the first training word vector and the second training word vector according to the first compression coding parameter and the second compression coding parameter, to obtain a first training statement vector of the first training sentence and a second training statement vector of the second training sentence; determining a vector distance between the first training statement vector and the second training statement vector; and when the vector distance does not meet a preset condition, acquiring a difference vector between the first training statement vector and the second training statement vector, performing error propagation on the difference vector using a BP algorithm for a neural network, and adjusting the first compression coding parameter and the second compression coding parameter according to the difference vector.

Exemplarily, because the first training sentence and the second training sentence have the same semantic meaning, if the vector distance is calculated using a cosine similarity, a condition may be preset as follows: the vector distance between the first training statement vector and the second training statement vector falls within [0.8, 1]; in this case, after compression coding is performed separately on a first training word vector $r_1$ and a second training word vector $r_2$ using the first compression coding parameter and the second compression coding parameter, an obtained vector distance between the first training statement vector and the second training statement vector is not within the interval, and then a difference vector between the first training word vector r1 and the second training word vector r2 is acquired, where the difference vector e=r1−r2. Error propagation is performed on the difference vector e using the BP algorithm for a neural network, and the first compression coding parameter and the second compression coding parameter are adjusted according to the difference vector.

The adjusting the first compression coding parameter according to the difference vector includes determining a layer error vector corresponding to each layer of neural network parameters in the first compression coding parameter, and determining a gradient of each layer of neural network parameters according to the layer error vector; and adjusting each layer of neural network parameters using an average value of the gradients of the layers of neural network parameters, or adjusting each layer of neural network parameters using a gradient of a lower-layer neural network parameter, or adjusting each layer of neural network parameters using a gradient of an upper-layer neural network parameter, where the lower-layer neural network parameter is a neural network parameter used in the last time of compression coding, and the upper-layer neural network parameter is a neural network parameter used in the first time of compression coding.

Exemplarily, a layer error vector corresponding to each layer of neural network parameters in the first compression coding parameter is determined using the difference vector e. For example, a layer error vector corresponding to a first layer neural network parameter in the first compression coding parameter is e1, a layer error vector corresponding to a second layer neural network parameter in the first compression coding parameter is e2, a layer error vector corresponding to a third layer neural network parameter in the first compression coding parameter is e3, and a gradient x of the first layer neural network parameter, a gradient y of the second layer neural network parameter, a gradient z of the third layer neural network parameter are determined using the layer error vectors e1, e2, and e3 respectively. Further, the first compression coding parameter may be adjusted in three optional manners. Manner 1: An average value of the gradient x of the first layer neural network parameter, the gradient y of the second layer neural network parameter, and the gradient z of the third layer neural network parameter is used to adjust each layer of neural network parameters; Manner 2: The gradient x of the first layer neural network parameter is used to adjust each layer of neural network parameters; and Manner 3: The gradient z of the third layer neural network parameter is used to adjust each layer of neural network parameters.

Further, the vector distance between the first training statement vector and the second training statement vector is redetermined using a first compression coding parameter and a second compression coding parameter that are obtained by means of the adjustment, and when the vector distance meets the preset condition, training performed on the first compression coding parameter and the second compression coding parameter is stopped.

S104: Determine a vector distance between the first statement vector and the second statement vector, and evaluate a semantic similarity between the first sentence and the second sentence according to the vector distance.

Optionally, $v_1$ is the first statement vector, $v_2$ is the second statement vector, and then the vector distance between the first statement vector and the second statement vector is obtained by calculating a formula:

$$sim(v_1, v_2) = \frac{(v_1 - v_2)(v_1 - v_2)}{|v_1 * v_2|},$$

where a value range of $sim(v_1, v_2)$ is $[0, +\infty]$. In this case, a smaller value of $sim(v_1, v_2)$ indicates a higher semantic similarity between the first sentence and the second sentence.

The foregoing formula used to calculate the vector distance between the first statement vector and the second statement vector is only an exemplary description, and no limitation is imposed thereto in the present disclosure. For example, the vector distance between the first statement vector and the second statement vector may also be calculated using a cosine similarity. The vector distance between the first statement vector and the second statement vector is calculated using a formula:

$$sim(v_1, v_2) = \frac{v_1 v_2}{|v_1||v_2|},$$

where a value range of $sim(v_1, v_2)$ is $[-1, 1]$. In this case, a larger value of $sim(v_1, v_2)$ indicates a higher semantic similarity between the first sentence and the second sentence. In addition, the semantic similarity between the first sentence and the second sentence may further be evaluated by calculating a Euclidean distance between the first statement vector and the second statement vector.

Using the foregoing solution, a first statement vector of a first sentence and a second statement vector of a second sentence are obtained by means of compression coding; a vector distance between the first statement vector and the second statement vector is calculated; and a semantic similarity between the first sentence and the second sentence is evaluated according to the vector distance, where a shorter vector distance indicates a higher semantic similarity between the first sentence and the second sentence. In this case, a sentence in which a word order is adjusted is represented as one vector, thereby avoiding separately comparing semantic meanings of words in a sentence; therefore, the technical solution in the present disclosure can be used to perform accurate semantic similarity evaluation on a sentence in which a word order is adjusted.

Figure 3:
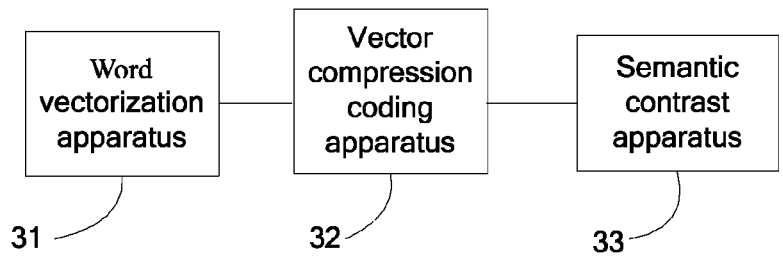
FIG. 3 is a schematic structural diagram of a semantic evaluation system according to an embodiment of the present disclosure.

An embodiment of the present disclosure provides a semantic evaluation system 30. Corresponding to the foregoing method embodiment in FIG. 1, all apparatuses of the semantic evaluation system 30 may be used in the steps of the foregoing method. As shown in FIG. 3, the semantic evaluation system 30 includes a word vectorization apparatus 31, a vector compression coding apparatus 32, and a semantic contrast apparatus 33, where the word vectorization apparatus 31 is connected to the vector compression coding apparatus 32, and the vector compression coding apparatus 32 is connected to the semantic contrast apparatus 33.

The word vectorization apparatus 31 is configured to perform word vectorization processing separately on words in a first sentence and a word in a second sentence to obtain a first word vector and a second word vector.

The first sentence includes at least two words, the first word vector includes word vectors of all the words in the first sentence, the second sentence includes at least one word, and the second word vector includes word vectors of all words in the second sentence.

The vector compression coding apparatus 32 is configured to perform, in a preset word vector compression order, compression coding processing on the first word vector according to a first compression coding parameter to obtain a first statement vector; and when the second sentence includes at least two words, perform, in the preset word vector compression order, compression coding processing on the second word vector according to a second compression coding parameter to obtain a second statement vector, or when the second sentence includes one word, use the second word vector as the second statement vector.

The semantic contrast apparatus 33 is configured to determine a vector distance between the first statement vector and the second statement vector, and evaluate a semantic similarity between the first sentence and the second sentence according to the vector distance.

Figure 4:
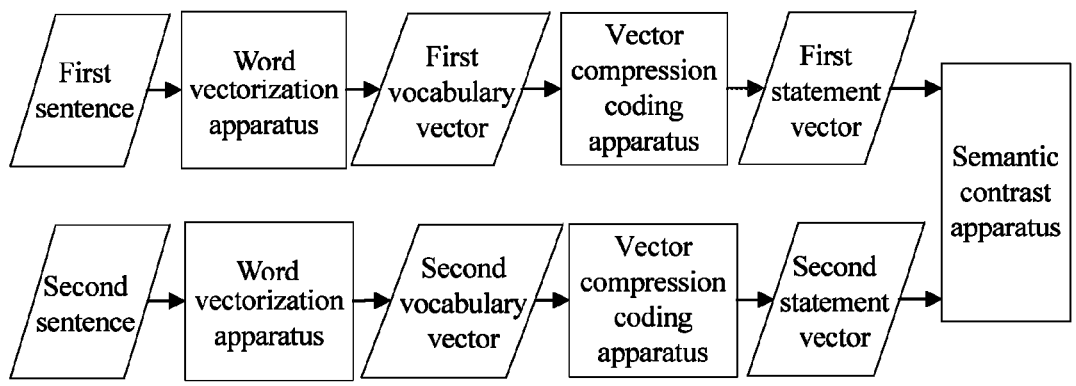
FIG. 4 is an inter-apparatus flowchart of a semantic similarity evaluation method according to an embodiment of the present disclosure.

It should be noted that, if the first sentence and the second sentence are sentences in different languages, the semantic evaluation system includes at least two word vectorization apparatuses and at least two vector compression coding apparatuses. As shown in FIG. 4, word vectorization processing is performed separately on the first sentence and the second sentence using two word vectorization apparatuses, and compression coding processing is performed separately on the first word vector and the second word vector using two vector compression coding apparatuses.

Exemplarily, a first sentence is: I eat apples. Then, three words "I", "eat", and "apples" are included in the first sentence, and a first word vector is obtained using a word vectorization technology, where the first word vector includes a word vector c1 of the word "I", a word vector c2 of the word "eat", and a word vector c3 of the word "apples". In addition, a compression order of the word vectors is preset to a left-to-right order; the vector compression coding apparatus 32 first performs compression coding on the word vectors c1 and c2, and then performs compression coding on the word vector c3.

It should be noted that a word vector compression order may be preset by a user; the above is only an exemplary description, and the present disclosure does not impose a limitation on the word vector compression order. The word vector compression order may also be from right to left, or the word vector compression order is set according to a grammatical structure. For example, a grammatical structure of the first sentence includes a subject, a predicate, and an object; it may be preset that compression coding is performed on a word vector of the predicate and a word vector of the object first, and then compression coding is performed on a word vector of the subject.

Optionally, the vector compression coding apparatus 32 is configured to perform compression coding for the first time on a first word vector and a second word vector in the first word vector according to a first layer neural network parameter to generate an intermediate compression vector, and perform compression coding for the second time on the intermediate compression vector and a third word vector according to a second layer neural network parameter until compression coding is performed on all word vectors in the first word vector, to obtain the first statement vector, where vector dimensions of all the word vectors in the first word vector, the intermediate compression vector, and the first statement vector are the same.

Exemplarily, compression coding of a vector refers to autoregression of the vector. In the compression coding, a model is created based on a statistic property of data and compression coding is performed on word vectors pairwise using a neural network parameter. For example, as shown in FIG. 2, the first compression coding parameter includes a first layer neural network parameter k1, a second layer neural network parameter k2, and a third layer neural network parameter k3. For word vectors c1, c2, c3, and c4, where vector dimensions of the word vectors c1, c2, c3, and c4 are 50, in a left-to-right order, first, the first layer neural network parameter k1 is used to perform compression coding on the word vectors c1 and c2 to obtain an intermediate compression vector w1 whose vector dimension is 50; then the second layer neural network parameter k2 is used to perform compression coding on the intermediate compression vector w1 and the word vector c3 to obtain an intermediate compression vector w2 whose vector dimension is 50; finally, the third layer neural network parameter k3 is used to perform compression coding on the intermediate compression vector w2 and the word vector c4 to obtain a first statement compression vector v1 whose vector dimension is 50.

Optionally, the semantic contrast apparatus 33 is configured to obtain, by calculating a formula $$sim(v_1, v_2) = \frac{(v_1 - v_2)(v_1 - v_2)}{|v_1 * v_2|},$$

the vector distance between the first statement vector and the second statement vector, where $v_1$ is the first statement vector, $v_2$ is the second statement vector, and $sim(v_1, v_2)$ is the vector distance.

Figure 5:
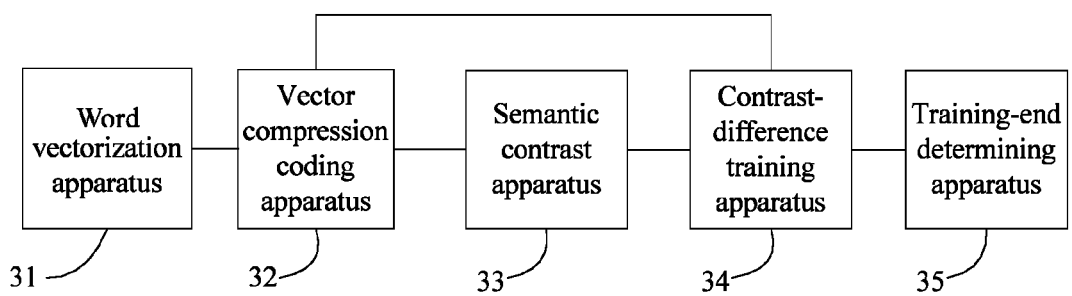
FIG. 5 is a schematic structural diagram of another semantic evaluation system according to an embodiment of the present disclosure.

Optionally, as shown in FIG. 5, the system further includes a contrast-difference training apparatus 34 and a training-end determining apparatus 35; the word vectorization apparatus 31 is further configured to perform word vectorization processing on a first training sentence in a bilingual parallel corpus and a second training sentence that has a same semantic meaning as the first training sentence, to obtain a first training word vector and a second training word vector; the vector compression coding apparatus 32 is further configured to perform compression coding separately on the first training word vector and the second training word vector according to the first compression coding parameter and the second compression coding parameter, to obtain a first training statement vector of the first training sentence and a second training statement vector of the second training sentence; the semantic contrast apparatus 33 is further configured to determine a vector distance between the first training statement vector and the second training statement vector; the training-end determining apparatus 35 is configured to determine whether the vector distance meets a preset condition; the contrast-difference training apparatus 34 is configured to, when the vector distance does not meet the preset condition, acquire a difference vector between the first training statement vector and the second training statement vector, and perform error propagation on the difference vector using a BP algorithm for a neural network; the vector compression coding apparatus 32 is further configured to adjust the first compression coding parameter and the second compression coding parameter according to the difference vector; and the training-end determining apparatus 35 is further configured to, when determining that the vector distance meets the preset condition, stop performing training on the first compression coding parameter and the second compression coding parameter.

Exemplarily, because the first training sentence and the second training sentence have the same semantic meaning, if the vector distance is calculated using a cosine similarity, a condition may be preset as follows: the vector distance between the first training statement vector and the second training statement vector falls within [0.8, 1]; in this case, after compression coding is performed separately on a first training word vector r1 and a second training word vector r2 using the first compression coding parameter and the second compression coding parameter, an obtained vector distance between the first training statement vector and the second training statement vector is not within the interval, and then a difference vector between the first training word vector r1 and the second training word vector r2 is acquired, where the difference vector e=r1−r2. Error propagation is performed on the difference vector e using the BP propagation algorithm for a neural network, and the first compression coding parameter and the second compression coding parameter are adjusted according to the difference vector.

Optionally, the vector compression coding apparatus 32 is configured to determine a layer error vector corresponding to each layer of neural network parameters in the first compression coding parameter, and determine a gradient of each layer of neural network parameters according to the layer error vector; and adjust each layer of neural network parameters using an average value of the gradients of the layers of neural network parameters, or adjust each layer of neural network parameters using a gradient of a lower-layer neural network parameter, or adjust each layer of neural network parameters using a gradient of an upper-layer neural network parameter, where the lower-layer neural network parameter is a neural network parameter used in the last time of compression coding, and the upper-layer neural network parameter is a neural network parameter used in the first time of compression coding.

Exemplarily, a layer error vector corresponding to each layer of neural network parameters in the first compression coding parameter is determined using the difference vector e. For example, a layer error vector corresponding to a first layer neural network parameter in the first compression coding parameter is e1, a layer error vector corresponding to a second layer neural network parameter in the first compression coding parameter is e2, a layer error vector corresponding to a third layer neural network parameter in the first compression coding parameter is e3, and a gradient x of the first layer neural network parameter, a gradient y of the second layer neural network parameter, a gradient z of the third layer neural network parameter are determined using the layer error vectors e1, e2, and e3 respectively. Further, the first compression coding parameter may be adjusted in three optional manners. Manner 1: An average value of the gradient x of the first layer neural network parameter, the gradient y of the second layer neural network parameter, and the gradient z of the third layer neural network parameter is used to adjust each layer of neural network parameters; Manner 2: The gradient x of the first layer neural network parameter is used to adjust each layer of neural network parameters; and Manner 3: The gradient z of the third layer neural network parameter is used to adjust each layer of neural network parameters.

Further, the vector distance between the first training statement vector and the second training statement vector is redetermined using a first compression coding parameter and a second compression coding parameter that are obtained by means of the adjustment, and when the vector distance meets the preset condition, training performed on the first compression coding parameter and the second compression coding parameter is stopped.

Using the foregoing semantic evaluation system, a first statement vector of a first sentence and a second statement vector of a second sentence are obtained by means of compression coding; a vector distance between the first statement vector and the second statement vector is calculated; and a semantic similarity between the first sentence and the second sentence is evaluated according to the vector distance, where a shorter vector distance indicates a higher semantic similarity between the first sentence and the second sentence. In this case, a sentence in which a word order is adjusted is represented as one vector, thereby avoiding separately comparing semantic meanings of words in a sentence; therefore, the technical solution in the present disclosure can be used to perform accurate semantic similarity evaluation on a sentence in which a word order is adjusted.

Figure 6:
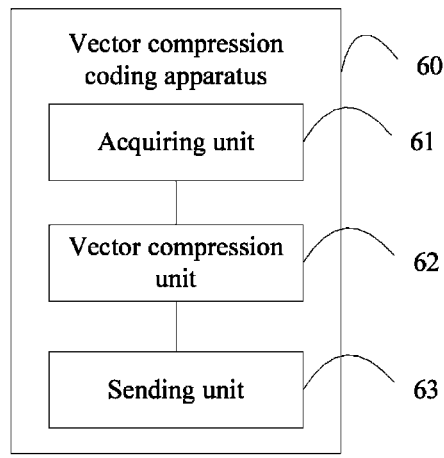
FIG. 6 is a schematic structural diagram of a vector compression coding apparatus according to an embodiment of the present disclosure.

As shown in FIG. 6, an embodiment of the present disclosure provides a vector compression coding apparatus 60, which is configured to implement the vector compression coding apparatus 32 in the semantic evaluation system shown in FIG. 3 of the present disclosure. The vector compression coding apparatus 60 includes an acquiring unit 61 configured to acquire a first word vector and a second word vector, where the first word vector includes word vectors of all words in a first sentence, the second word vector includes word vectors of all words in a second sentence, the first sentence includes at least two words, and the second sentence includes at least one word; a vector compression unit 62 configured to perform, in a preset word vector compression order, compression coding processing on the first word vector according to a first compression coding parameter to obtain a first statement vector; and when the second sentence includes one word, use the second word vector as a second statement vector; or when the second sentence includes at least two words, perform, in the preset word vector compression order, compression coding processing on the second word vector according to a second compression coding parameter to obtain a second statement vector; and a sending unit 63 configured to send the first statement vector and the second statement vector to a semantic contrast apparatus, such that the semantic contrast apparatus determines a vector distance between the first statement vector and the second statement vector, and evaluates a semantic similarity between the first sentence and the second sentence according to the vector distance.

Using the foregoing vector compression coding apparatus, a first statement vector of a first sentence and a second statement vector of a second sentence are obtained by the vector compression coding apparatus by means of compression coding, such that a semantic contrast apparatus calculates a vector distance between the first statement vector and the second statement vector, and evaluates a semantic similarity between the first sentence and the second sentence according to the vector distance, where a shorter vector distance indicates a higher semantic similarity between the first sentence and the second sentence. In this case, a sentence in which a word order is adjusted is represented as one vector, thereby avoiding separately comparing semantic meanings of words in a sentence; therefore, the technical solution in the present disclosure can be used to perform accurate semantic similarity evaluation on a sentence in which a word order is adjusted.

It may be clearly understood by persons skilled in the art that, for the purpose of convenient and brief description, division of the foregoing function modules is taken as an example for illustration. In actual application, the foregoing functions can be allocated to different modules for completion according to a requirement, that is, an inner structure of an apparatus is divided into different function modules to implement all or some of the functions described above. For a detailed working process of the foregoing system, apparatus, and unit, reference may be made to a corresponding process in the foregoing method embodiment, and details are not described herein again.

Figure 7:
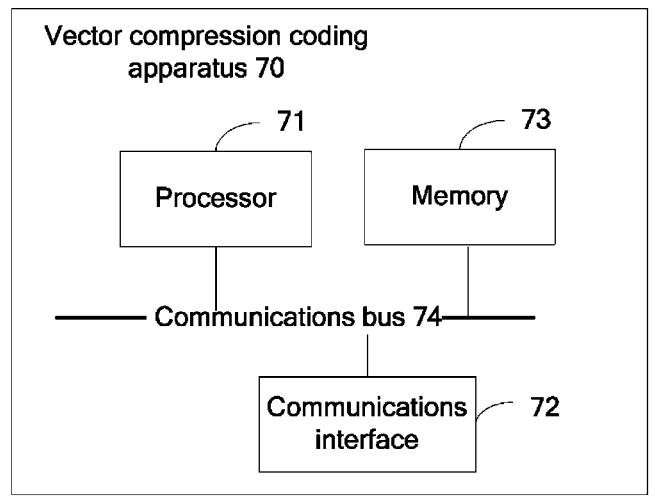
FIG. 7 is a schematic structural diagram of another vector compression coding apparatus according to an embodiment of the present disclosure.

As shown in FIG. 7, an embodiment of the present disclosure further provides a vector compression coding apparatus 70, which is configured to implement the vector compression coding apparatus 32 in the semantic evaluation system shown in FIG. 3 of the present disclosure. The vector compression coding apparatus 70 is separately connected to the word vectorization apparatus 31 and the semantic contrast apparatus 33 shown in FIG. 3 of the present disclosure. The vector compression coding apparatus 70 includes a processor 71, a communications interface 72, a memory 73, and a communications bus 74, where the processor 71, the communications interface 72, and the memory 73 are interconnected by the communications bus 74 and communicate with each other using the communications bus 74.

The vector compression coding apparatus 70 separately communicates with the word vectorization apparatus 31 and the semantic contrast apparatus 33 using the communications interface 72.

The processor 71 may be a general purpose processor, a central processing unit (CPU), a network processor (NP), or the like; or may also be a digital signal processor (DSP), an application-specific integrated circuit (ASIC), a field programmable gate array (FPGA), or another programmable logical device.

The memory 73 is configured to store program code, where the program code includes computer operation instructions. The memory 73 may include a high-speed random access memory (RAM), or may further include a non-volatile memory, for example, at least one disk memory.

The processor 71 is configured to execute the program code in the memory 73 to implement the following operations: acquiring a first word vector and a second word vector, where the first word vector includes word vectors of all words in a first sentence, the second word vector includes word vectors of all words in a second sentence, the first sentence includes at least two words, and the second sentence includes at least one word; performing, in a preset word vector compression order, compression coding processing on the first word vector according to a first compression coding parameter to obtain a first statement vector; when the second sentence includes one word, using the second word vector as a second statement vector; or when the second sentence includes at least two words, performing, in the preset word vector compression order, compression coding processing on the second word vector according to a second compression coding parameter to obtain a second statement vector; and sending the first statement vector and the second statement vector to the semantic contrast apparatus 33, such that the semantic contrast apparatus 33 determines a vector distance between the first statement vector and the second statement vector, and evaluates a semantic similarity between the first sentence and the second sentence according to the vector distance.

In the several embodiments provided in the present application, it should be understood that the disclosed system and apparatus may be implemented in other manners. For example, the described system embodiment is merely exemplary. For example, the division of the apparatus is merely logical function division and may be other division in actual implementation. For example, a plurality of apparatuses may be combined or integrated into another system, or some features may be ignored or not performed.

The apparatus described as separate parts may or may not be physically separate, and parts displayed as apparatuses may or may not be physical units, may be located in one position, or may be distributed on a plurality of network units. Some or all of the units may be selected according to actual requirements to achieve the objectives of the solutions of the embodiments.

The foregoing descriptions are merely implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A semantic similarity evaluation method, comprising:
performing word vectorization processing separately on words in a first sentence and a word in a second sentence to obtain a first word vector and a second word vector, wherein the first sentence comprises at least two words, wherein the first word vector comprises word vectors of all words in the first sentence, wherein the second sentence comprises at least one word, and wherein the second word vector comprises word vectors of all words in the second sentence;
performing, in a preset word vector compression order, compression coding processing on the first word vector according to a first compression coding parameter to obtain a first statement vector;
using, when the second sentence comprises one word, the second word vector as a second statement vector;
performing, in the preset word vector compression order when the second sentence comprises at least two words, compression coding processing on the second word vector according to a second compression coding parameter to obtain a second statement vector;
determining a vector distance between the first statement vector and the second statement vector by obtaining, by calculating a formula $$sim(v_1, v_2) = \frac{(v_1 - v_2)(v_1 - v_2)}{|v_1 * v_2|},$$

the vector distance between the first statement vector and the second statement vector, wherein $v_1$ is the first statement vector, $v_2$ is the second statement vector, and $sim(v_1, v_2)$ is the vector distance;
evaluating a semantic similarity between the first sentence and the second sentence according to the vector distance; and
providing a translated text with the first sentence to a user when the semantic similarity meets a preset condition.

2. The method according to claim 1, wherein the first compression coding parameter comprises at least two layers of neural network parameters, and wherein performing, in the preset word vector compression order, compression coding processing on the first word vector according to the first compression coding parameter to obtain the first statement vector comprises:
performing compression coding for a first time on a third word vector and a fourth word vector in the first word vector according to a first layer neural network parameter to generate an intermediate compression vector; and performing compression coding for a second time on the intermediate compression vector and a fifth word vector according to a second layer neural network parameter until compression coding is performed on all word vectors in the first word vector, to obtain the first statement vector, wherein vector dimensions of all the word vectors in the first word vector, the intermediate compression vector, and the first statement vector are the same.

3. The method according to claim 1, further comprising perforating training on the first compression coding parameter and the second compression coding parameter using a bilingual parallel corpus, wherein the training comprises:

performing word vectorization processing on a first training sentence in the bilingual parallel corpus and a second training sentence that has a same semantic meaning as the first training sentence, to obtain a first training word vector and a second training word vector;

performing compression coding separately on the first training word vector and the second training word vector according to the first compression coding parameter and the second compression coding parameter, to obtain a first training statement vector of the first training sentence and a second training statement vector of the second training sentence;

determining a vector distance between the first training statement vector and the second training statement vector;

acquiring, when the vector distance does not meet the preset condition, a difference vector between the first training statement vector and the second training statement vector, performing error propagation on the difference vector using a back propagation algorithm for a neural network, and adjusting the first compression coding parameter and the second compression coding parameter according to the difference vector; and redetermining a vector distance between the first training statement vector and the second training statement vector using a third compression coding parameter and a fourth compression coding parameter that are obtained by means of the adjustment, and when the vector distance meets the preset condition, stopping performing training on the first compression coding parameter and the second compression coding parameter.

4. The method according to claim 3, wherein adjusting the first compression coding parameter and the second compression coding parameter according to the difference vector comprises:

determining a layer error vector corresponding to each layer of neural network parameters in the first compression coding parameter, and determining a gradient of each layer of neural network parameters according to the layer error vector; and adjusting each layer of neural network parameters using at least one of:

an average value of the gradients of the layers of neural network parameters;

a gradient of a lower-layer neural network parameter; and a gradient of an upper-layer neural network parameter, wherein the lower-layer neural network parameter is a neural network parameter used in a last time of compression coding, and wherein the upper-layer neural network parameter is a neural network parameter used in a first time of compression coding.

5. A semantic evaluation system, comprising:
a word vectorization apparatus;
a vector compression coding apparatus; and
a semantic contrast apparatus, wherein the word vectorization apparatus is connected to the vector compression coding apparatus, and the vector compression coding apparatus is connected to the semantic contrast apparatus, wherein the word vectorization apparatus is configured to perform word vectorization processing separately on words in a first sentence and a word in a second sentence to obtain a first word vector and a second word vector, wherein the first sentence comprises at least two words, wherein the first word vector comprises word vectors of all words in the first sentence, wherein the second sentence comprises at least one word, and wherein the second word vector comprises word vectors of all words in the second sentence, wherein the vector compression coding apparatus is configured to perform, in a preset word vector compression order, compression coding processing on the first word vector according to a first compression coding parameter to obtain a first statement vector, wherein, when the second sentence comprises at least two words, the vector compression coding apparatus is configured to perform, in the preset word vector compression order, compression coding processing on the second word vector according to a second compression coding parameter to obtain a second statement vector, wherein, when the second sentence comprises one word, the vector compression coding apparatus is configured to use the second word vector as a second statement vector, and wherein the semantic contrast apparatus is configured to:
determine a vector distance between the first statement vector and the second statement vector by obtaining, by calculating a formula $$sim(v_1, v_2) = \frac{(v_1 - v_2)(v_1 - v_2)}{|v_1 * v_2|},$$

the vector distance between the first statement vector and the second statement vector, wherein $v_1$ is the first statement vector, $v_2$ is the second statement vector, and $sim(v_1, v_2)$ is the vector distance;

evaluate a semantic similarity between the first sentence and the second sentence according to the vector distance; and provide a translated text with the first sentence to a user when the semantic similarity meets a preset condition.

6. The system according to claim 5, wherein the vector compression coding apparatus is further configured to:

perform compression coding for a first time on a third word vector and a fourth word vector in the first word vector according to a first layer neural network parameter to generate an intermediate compression vector; and perform compression coding for a second time on the intermediate compression vector and a fifth word vector according to a second layer neural network parameter until compression coding is performed on all word vectors in the first word vector, to obtain the first statement vector, wherein vector dimensions of all the word vectors in the first word vector, the intermediate compression vector, and the first statement vector are the same.

7. The system according to claim 5, further comprising:
a contrast-difference training apparatus; and
a training-end determining apparatus,
wherein the word vectorization apparatus is further configured to perform word vectorization processing on a first training sentence in a bilingual parallel corpus and a second training sentence that has a same semantic meaning as the first training sentence, to obtain a first training word vector and a second training word vector,
wherein the vector compression coding apparatus is further configured to perform compression coding separately on the first training word vector and the second training word vector according to the first compression coding parameter and the second compression coding parameter, to obtain a first training statement vector of the first training sentence and a second training statement vector of the second training sentence,
wherein the semantic contrast apparatus is further configured to determine a vector distance between the first training statement vector and the second training statement vector,
wherein the training-end determining apparatus is configured to determine whether the vector distance meets the preset condition,
wherein the contrast-difference training apparatus is configured to, when the vector distance does not meet the preset condition, acquire a difference vector between the first training statement vector and the second training statement vector, and perform error propagation on the difference vector using a back propagation algorithm for a neural network,
wherein the vector compression coding apparatus is further configured to adjust the first compression coding parameter and the second compression coding parameter according to the difference vector, and
wherein the training-end determining apparatus is further configured to stop performing training on the first compression coding parameter and the second compression coding parameter, when determining that the vector distance meets the preset condition.

8. The system according to claim 7, wherein the vector compression coding apparatus is further configured to:
determine a layer error vector corresponding to each layer of neural network parameters in the first compression coding parameter;
determine a gradient of each layer of neural network parameters according to the layer error vector; and
adjust each layer of neural network parameters using at least one of:
an average value of the gradients of the layers of neural network parameters;
a gradient of a lower-layer neural network parameter; and
a gradient of an upper-layer neural network parameter,
wherein the lower-layer neural network parameter is a neural network parameter used in a last time of compression coding, and wherein the upper-layer neural network parameter is a neural network parameter used in a first time of compression coding.

9. A vector compression coding apparatus, comprising:
a memory;
a processor coupled to the memory, wherein the processor is configured execute instructions stored on the memory and cause the vector compression coding apparatus to:
acquire a first word vector and a second word vector, wherein the first word vector comprises word vectors of all words in a first sentence, wherein the second word vector comprises word vectors of all words in a second sentence, wherein the first sentence comprises at least two words, and wherein the second sentence comprises at least one word;
perform, in a preset word vector compression order, compression coding processing on the first word vector according to a first compression coding parameter to obtain a first statement vector;
to use the second word vector as a second statement vector when the second sentence comprises one word;
perform, in the preset word vector compression order, compression coding processing on the second word vector according to a second compression coding parameter to obtain a second statement vector when the second sentence comprises at least two words;
send the first statement vector and the second statement vector to a semantic contrast apparatus, such that the semantic contrast apparatus determines a vector distance between the first statement vector and the second statement vector by obtaining, by calculating a formula $$sim(v_1, v_2) = \frac{(v_1 - v_2)(v_1 - v_2)}{|v_1 * v_2|},$$

the vector distance between the first statement vector and the second statement vector, wherein $v_1$ is the first statement vector, $v_2$ is the second statement vector, and $sim(v_1, v_2)$ is the vector distance;
evaluate a semantic similarity between the first sentence and the second sentence according to the vector distance; and
provide a translated text with the first sentence to a user when the semantic similarity is acceptable.

* * * * *

UNITED STATES PATENT AND TRADEMARK OFFICE
CERTIFICATE OF CORRECTION

PATENT NO. : 9,665,565 B2
APPLICATION NO. : 14/982365
DATED : May 30, 2017
INVENTOR(S) : L. Ma et al.

It is certified that error appears in the above-identified patent and that said Letters Patent is hereby corrected as shown below:

In the Claims

Column 17, Line 14, Claim 3 should read:
performing training on the first compression coding parameter Column 20, Line 26, Claim 9 should read:
use the second word vector as a second statement Signed and Sealed this
First Day of August, 2017

Joseph Matal
*Performing the Functions and Duties of the*
*Under Secretary of Commerce for Intellectual Property and*
*Director of the United States Patent and Trademark Office*